US008530797B2

(12) United States Patent
Tassan-Mangina et al.

(10) Patent No.: US 8,530,797 B2
(45) Date of Patent: Sep. 10, 2013

(54) COOKING APPLIANCE

(75) Inventors: Franco Tassan-Mangina, Pordenone (IT); Alessandro Canova, Pordenone (IT); Omero Tuzzi, Pordenone (IT); Marino Fadelli, Pordenone (IT)

(73) Assignee: Electrolux Professional S.p.A., Pordenone (IT)

( * ) Notice: Subject to any disclaimer, the term of this patent is extended or adjusted under 35 U.S.C. 154(b) by 179 days.

(21) Appl. No.: 12/955,115

(22) Filed: Nov. 29, 2010

(65) Prior Publication Data

US 2011/0132895 A1 Jun. 9, 2011

(30) Foreign Application Priority Data

Dec. 4, 2009 (EP) ..................................... 09178106

(51) Int. Cl.
*H05B 3/68* (2006.01)
*A47J 37/06* (2006.01)
(52) U.S. Cl.
USPC ......................................... 219/450.1; 99/349

(58) Field of Classification Search
USPC ................ 219/450.1, 524, 678–681; 99/349, 99/377–379
See application file for complete search history.

(56) References Cited

U.S. PATENT DOCUMENTS 6,026,736 A * 2/2000 Turner ............................ 99/349
7,449,665 B2 * 11/2008 Fadelli et al. .................. 219/680

* cited by examiner

*Primary Examiner* — Sang Paik
(74) *Attorney, Agent, or Firm* — Pearne & Gordon LLP

(57) ABSTRACT

A cooking appliance (1) includes a lower casing (2), a lower food-contacting heating plate (3), and an upper bell-shaped body (4) which is movably mounted on the lower casing (2) so as to be movable to and from a closed position. An upper food-contacting heating plate (5) is located inside the bell-shaped body (4) so as to be positioned, when the bell-shaped body (4) is in the closed position, over the lower heating plate (3). The upper food-contacting heating plate (5) is connected to the bell-shaped body (4) to move freely inside the bell-shaped body (4) in a direction (d0) substantially perpendicular to the reference laying plane of the upper heating plate (5). A heating-plate locking device (14) selectively impairs movement of the upper heating plate (5) in the moving direction (d0), and a control unit (9) controls the heating-plate locking device (14).

20 Claims, 5 Drawing Sheets

COOKING APPLIANCE

The present invention relates to a cooking appliance.

More specifically, the present invention relates to an electric grill for cooking and/or heating sandwiches, hamburgers, toasts and similar food products at the same time on both sides thereof, to which the following description refers purely by way of example.

As is known, standard double-side electric grills generally comprise a lower box-like casing structured for resting on a generic working table; a lower food-contacting heating plate fixed on the top of the box-like casing in a horizontal position, and structured for directly supporting the food products to be cooked; and an upper food-contacting heating plate which is movable onto the casing to and from a cooking position in which said upper heating plate is located over the lower heating plate substantially parallel to the latter, so to abuts on the upper part of the food products laying on the lower heating plate.

More specifically, the upper heating plate is fixed to the distal end of a manually movable supporting arm which is pivotally jointed to the lower casing so as to rotated about an horizontal reference axis between a lowered position in which the supporting arm extends substantially horizontally and places the upper heating plate immediately over the lower heating plate, in the cooking position, and a raised position in which the supporting arm extends substantially vertically and places the upper heating plate faraway from the lower heating plate, in a substantially vertical position, so to allow the user to easily remove or lay the foods products on the lower heating plate.

The above-cited standard double-side electric grills are also provided with two electric heating devices, namely two resistors, which are inserted into or located immediately on the back of both the upper and the lower heating plate so to heat up the heating plates, or to directly heat up the food products abutting on said heating plates.

Despite being really fast in heating up food products, unfortunately this type of double-side electric grill isn't able to cook food products in a uniform and optimal manner.

In fact, when removed from these kind of cooking appliances, certain types of food products are externally completely cooked or even slightly burned, whereas the inside of the food products remains substantially uncooked or even raw. This result is usually due to the fact that the outer part of the food product acts as a thermal shield and prevent the heat from reaching the center of the food product.

To solve this drawback, new double-side electric grills have been introduced on the market which use a combination of microwaves and thermal heating for cooking both the outside and the inside of the food products resting on the lower heating plate.

In these new double-side electric grills, the upper heating plate is attached on the ceiling of a bell-shaped body which is hinged to the casing so as to rotate/move between a closed position in which the annular rim of the bell-shaped body abuts on the top of the lower box-like casing around the lower heating plate, so as to define, together with the casing, a closed cavity containing both the upper and the lower heating plates; and a completely opened position in which the annular rim of the bell-shaped body lays on a reference plane substantially perpendicular to the lower heating plate, sideways of the latter, so to allow the user to easily remove or lay the foods products on the lower heating plate.

The casing and the bell-shaped body are made of metal and structured so as to realize a microwaves-tight closed cavity, and these new double-side electric grills are also provided with one or more microwave generators which are located inside the box-like casing, below the lower heating plate, and are structured for flooding microwaves into the closed cavity during the cooking cycle.

The main drawback of these new double-side electric grills lies in that, when the upper heating plate is located in the cooking position, the distance between the upper and the lower heating plates is fixed and depends on the height of the ceiling of the bell-shaped body. Thus, when relative thin food products rest on the lower heating plate, the upper heating plate may be unable to abut on the upper part of the food products, reducing heat transfer and cooking efficiency.

To overcome this drawback, in EP-1913853 and EP-2063686 the upper heating plate is coupled to the bell-shaped body so as to freely move with respect to the ceiling of the bell-shaped body in a direction locally perpendicular to the upper heating plate, so that, when the user places the bell-shaped body in the closed position, the upper heating plate can move downwards by gravity and always abut on the food products resting on the lower heating plate irrespective of the thickness of said food products.

In addition to the above, a number of coil springs is also interposed between the ceiling of the bell-shaped body and the back of the upper heating plate, so to increase the force pushing the upper heating plate against the food products resting on the lower heating plate, thus improving heat transfer between the food and both the upper and the lower heating plates.

Unfortunately the floating connection between the ceiling of the bell-shaped body and the upper heating plate disclosed in EP-1913853 and EP-2063686 causes several cooking problems on sandwiches and other soft food products.

In fact, during the cooking cycle, a continuous pressing of the sandwich can cause an excessive crushing of the slices of bread which compromises general appearance and softness of the sandwich.

Aim of the present invention is therefore to provide an electric grill for cooking and/or heating food products at the same time on both sides thereof, which is designed to eliminate the aforementioned drawbacks.

In compliance with the above aims, according to the present invention a cooking appliance is provided as specified in claim 1 and preferably, though not necessarily, in any one of the dependent claims.

A non-limiting embodiment of the present invention will now be described by way of example with reference to the accompanying drawings, in which.

Figure 1:
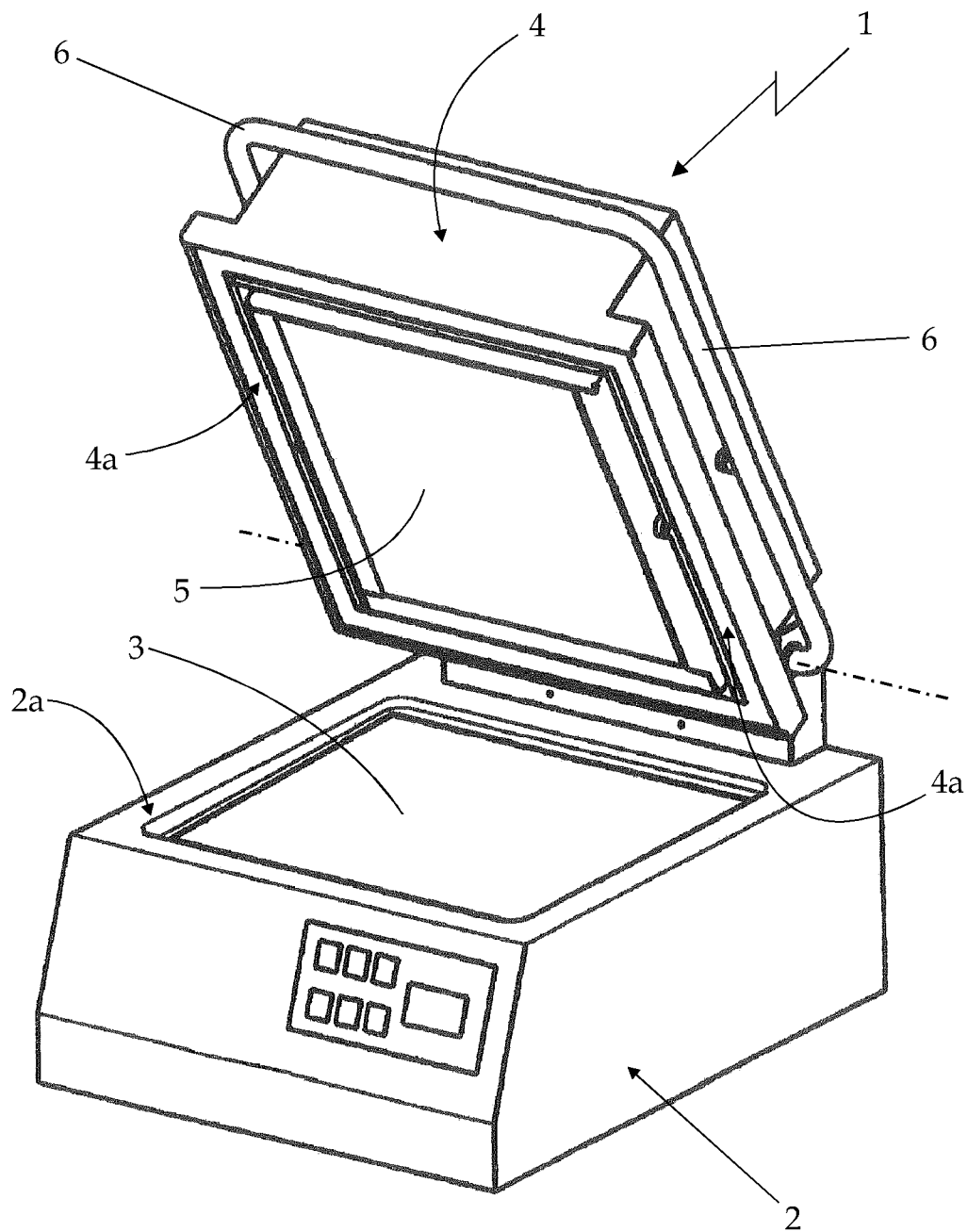
FIG. 1 is a perspective view, with parts removed for clarity, of a cooking appliance realized in accordance with the teachings of the present invention.
Figure 2:
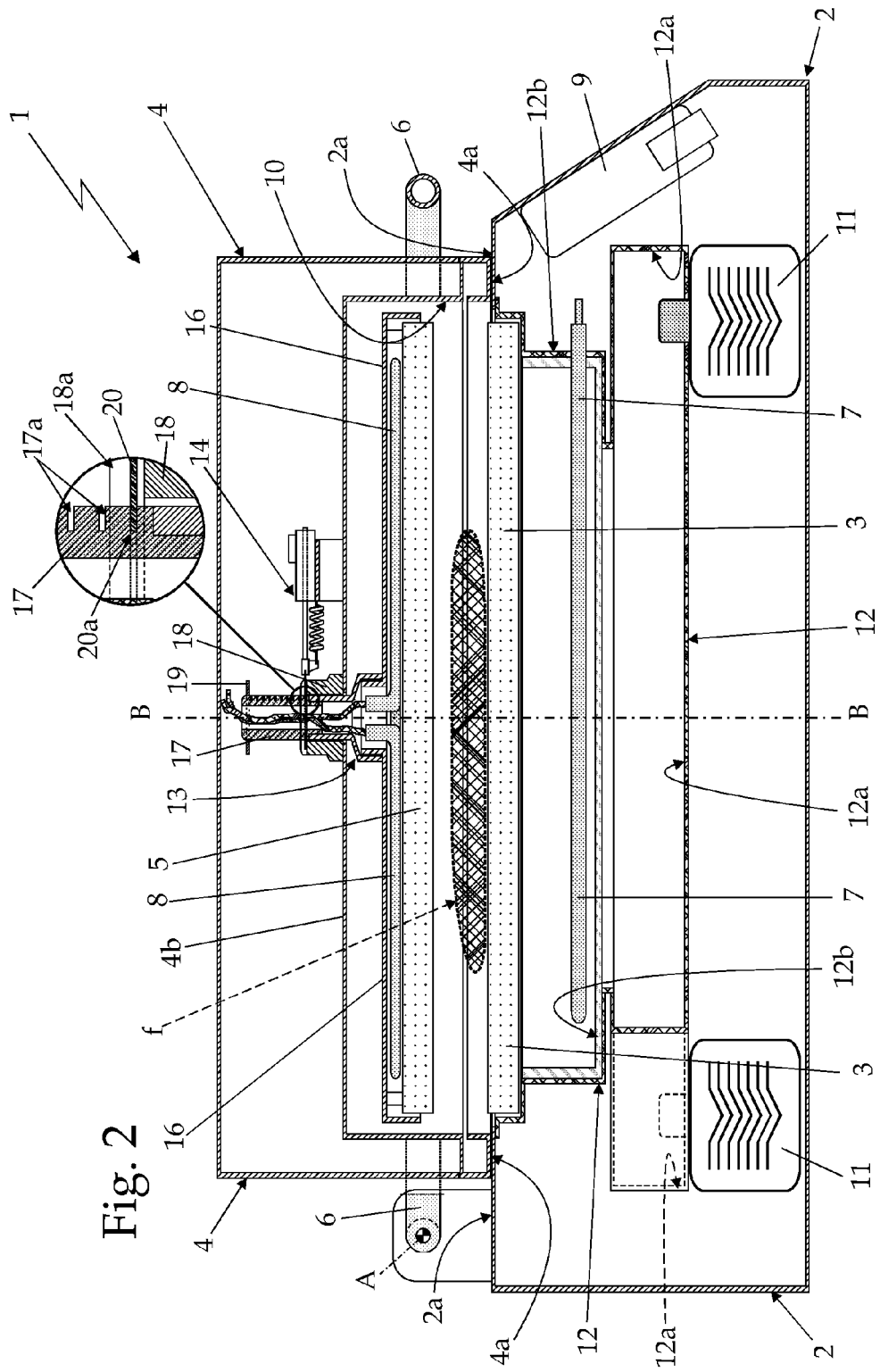
FIG. 2 is a side view, with parts in section and parts removed for clarity, of the FIG. 1 cooking appliance.

With reference to FIGS. 1 and 2, number 1 indicates as a whole an electric cooking appliance structured for cooking and/or heating sandwiches, hamburgers, toasts and similar food products at the same time on both side thereof.

Cooking appliance 1 comprises a preferably, though not necessarily, parallelepiped-shaped, lower box-like casing 2 structured for resting on a generic working table; a lower food-contacting heating plate 3 which is positioned on the top wall 2a of casing 2 in a substantially horizontal position, and is structured for directly supporting the food products f to be cooked; and an upper bell-shaped body 4 which is movably mounted on casing 2 so as to be manually movable between a closed position (see FIG. 2) in which the annular rim 4a of bell-shaped body 4 completely abuts on the top wall 2a of box-like casing 2 around heating plate 3, and defines, together with lower casing 2, a closed cavity containing heating plate 3, and a completely opened position (see FIG. 1) in which the user can easily access the heating plate 3, such as for removing the foods products f from it or leaning the foods products f on it. Advantageously, in such completely open position, the annular rim 4a of the bell-shaped body 4 may lay on a reference laying plane substantially perpendicular to the upper face of heating plate 3, or making an angle slightly lower than 90° with the latter, above and substantially sideways of the latter.

Furthermore cooking appliance 1 comprises an upper food-contacting heating plate 5 which is fixed inside the bell-shaped body 4, close to the ceiling 4b of the latter (defining a frame member), so as to be positioned, when the bell-shaped body 4 is resting on the top of casing 2 in the closed position, immediately over lower heating plate 3, substantially parallel to the latter.

More specifically, when bell-shaped body 4 rests on the top of casing 2 in the closed position, the upper heating plate 5 is located, together with the lower heating plate 3, inside the closed cavity formed by the bell-shaped body 4 and the top wall 2a of casing 2, in a cooking position in which heating plate 5 directly faces heating plate 3, spaced above and substantially parallel to the latter, so as to abuts on the upper part of the food products f laying on the lower heating plate 3.

In particular, with reference to FIGS. 1 and 2, in the example shown bell-shaped body 4 is stably fixed to the distal end of a supporting arm 6 which is pivotally jointed on casing 2 so as to be manually rotated about an horizontal reference axis A, between a lowered position (see FIG. 2) in which supporting arm 6 extends substantially parallel to the top wall 2a of casing 2, i.e. substantially horizontal, so as to place the bell-shaped body 4 in abutment on top wall 2a of casing 2 in the closed position; and a raised position (see FIG. 1) in which supporting arm 6 extends substantially perpendicular to the top wall 2a of casing 2, i.e. substantially vertical, or makes an angle slightly lower than 90° with the latter, and places the bell-shaped body 4 above and faraway from the lower heating plate 3, in the opened position.

With reference to FIG. 2, cooking appliance 1 is also provided with two electric heating devices 7 and 8, namely two resistors, which are stably located on the back of, respectively, the lower heating plate 3 and the upper heating plate 5, so to heat up, on command, heating plates 3 and 5 and the food products f abutting on said heating plates; and with a central control unit 9 which is able to switch on and off heating devices 7 and 8 according to a cooking cycle set-up by the user preferably, though not necessarily, via suitable knobs and/or bottoms located on an external control panel.

With reference to FIGS. 1 and 2, in the example shown the control panel is preferably, though not necessarily, located on the front wall of casing 2.

In addition to the above, casing 2 and bell-shaped body 4 are structured so as to realize, when bell-shaped body 4 rests on the top of casing 2 in the closed position, a microwaves-tight closed cavity 10, and cooking appliance 1 also comprises at least one electric microwave generator 11 structured for generating, on command, microwaves of known frequency and amplitude; and a corresponding waveguide assembly 12 which connects the microwave generator 11 to the microwaves-tight closed cavity 10, and is structured for channeling the microwaves from the microwave generator 11 to the microwaves-tight closed cavity 10 during the cooking cycle.

The electric microwave generator 11 is preferably, though not necessarily, controlled by the central control unit 9, and is switched on and off according to the cooking cycle set-up by the user.

More specifically, in the example shown lower casing 2 and bell-shaped body 4 are preferably, though not necessarily, made of metal material, whereas lower heating plate 3 and upper heating plate 5 are preferably, though not necessarily, made of glass-ceramic or other rigid material which is resistant to high temperatures and is transparent to both microwave and infrared radiation, so that both the heat produced by heating devices 7 and 8, and the microwaves produced by microwave generator 11 can easily reach the food products f housed within the microwaves-tight closed cavity 10 formed by casing 2 and bell-shaped body 4.

In particular, with reference to FIG. 2, in the example shown cooking appliance 1 is preferably, though not necessarily, provided with two microwave generators 11, namely two magnetrons, which are located inside the lower casing 2, below lower heating plate 3 and the corresponding heating device 7; and with two separate waveguide ducts 12a which are located inside the lower casing 2, below lower heating plate 3, and each of which connects in known manner a respective microwave generator 11 to a common microwave collector 12b which is located inside the lower casing 2, immediately below heating plate 3. The common microwave collector 12b is faced to the back of heating plate 3 and the corresponding heating device 7, and is structured for channeling the microwaves arriving from both microwave generators 11 through the lower heating plate 3, inside the microwaves-tight closed cavity 10 formed by casing 2 and bell-shaped body 4.

More specifically, in the example shown the common microwave collector 12b consists in a substantially parallelepiped-shaped basin 12b made of metal material, which is located close to the upper wall 2a of casing 2 and is internally coated with a layer of known thermal-isolating and microwave-permeable material; whereas each waveguide duct 12a consists in a box-like element 12a which is made of metal material and communicates directly with the bottom of basin 12b.

The lower heating plate 3 is fixed on the top wall 2a of casing so as to close basin 12b, and heating device 7 is housed into basin 12b close to the bottom of the latter.

Figure 3:
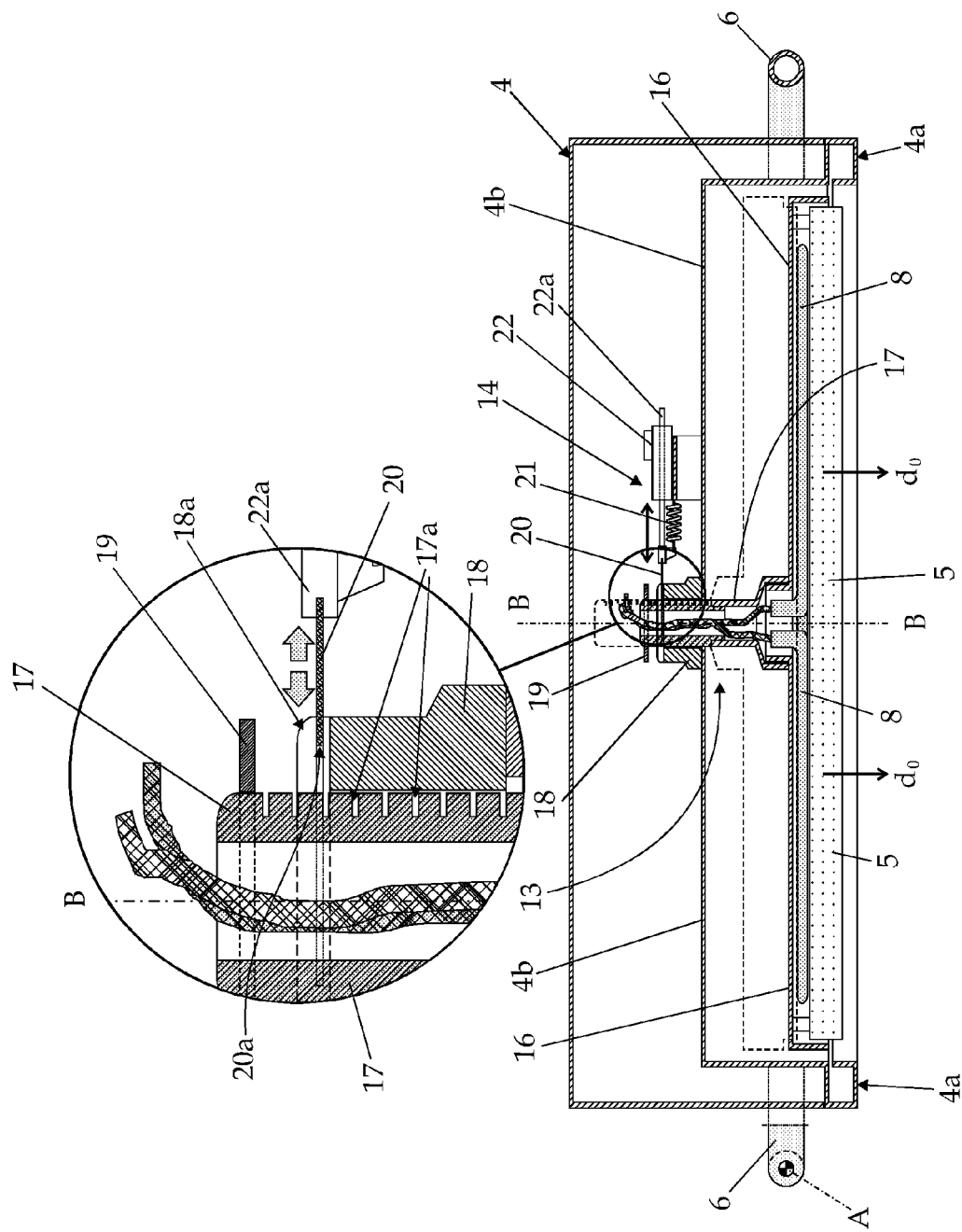
FIG. 3 is an enlarged view, with parts in section and parts removed for clarity, of the upper portion of the cooking appliance shown in FIG. 2.

Instead, with reference to FIGS. 2 and 3, upper heating plate 5 and the corresponding heating device 8 are fixed to the ceiling 4b of bell-shaped body 4 by means of a connecting assembly 13 which is structured so as to allow the upper heating plate 5 and the corresponding heating device 8 to move freely inside bell-shaped body 4 in a direction $d_o$ locally substantially perpendicular to the reference laying plane of upper heating plate 5, so that, when the user places the bell-shaped body 4 on the top wall 2a of casing 2 in the closed position, the upper heating plate 5 can move downwards by gravity, towards the lower heating plate 3, and abut on the food products f resting on the lower heating plate 3 irrespective of the thickness of said food products f.

However, differently from known cooking appliances of this kind, cooking appliance 1 is also provided with a heating-plate locking device 14 which is able, on command, to selectively impair any movement of the upper heating plate 5 with respect to the ceiling 4b of the bell-shaped body 4, in direction $d_0$; and with an auxiliary control unit which controls the locking device 14 so as to activate said locking device 14 after a given lapse of time from the starting of the cooking cycle for impairing any further movement of the upper heating plate 5 with respect to the bell-shaped body 4.

The length of this lapse of time may be set-up by the user together with the other parameters of the cooking cycle, or may be automatically determined by the auxiliary control unit according to the food products f to be cooked. For example, the external control panel of central control unit 9 may have a rotatable knob for allowing the user to manually select the kind of food product f to be cooked, and the auxiliary control unit has stored within itself a specific lapse of time for each kind of food product f.

Obviously, the length of this lapse of time may also be constant and preset in the auxiliary control unit.

More specifically, cooking appliance 1 is provided with a heating-plate locking device 14 which is able, on command, to rigidly connect the upper heating plate 5 and the corresponding heating device 8 to the bell-shaped body 4, so as to selectively impair any further movement of the upper heating plate 5 and the corresponding heating device 8 with respect to ceiling 4b of the bell-shaped body 4; and the auxiliary control unit activates the locking device 14 after a given lapse of time from the starting of the cooking cycle.

In the example shown, the auxiliary control unit is preferably, though not necessarily, integrated into the central control unit 9 which is therefore able to switch on and off the two heating devices 7 and 8, the two microwave generators 11 and the heating-plate locking device 14 according to the cooking cycle set-up by the user.

With reference to FIGS. 2 and 3, in the example shown the connecting assembly 13 comprises a rear supporting plate 16 which is directly faced to ceiling 4b of bell-shaped body 4, and is rigidly connected to the back of the upper heating plate 5 so as to also keep the heating device 8 stably in abutment on the back of the same heating plate 5; and a rectilinear tubular rod 17 which protrudes from the center of the rear supporting plate 16 towards ceiling 4b of bell-shaped body 4, and fits in sliding manner into a bush 18 which is firmly fixed on the ceiling 4b of bell-shaped body 4.

Both tubular rod 17 and bush 18 extends coaxial to an axis B substantially perpendicular to the reference laying plane of the upper heating plate 5, i.e. parallel to moving direction $d_0$, and are telescopically coupled one another so that tubular rod 17 can freely move axially inside bush 18, through the ceiling 4b of bell-shaped body 4, slowed down only by the friction force between the two elements.

Preferably, thought not necessarily, connecting assembly 13 is also provided with a stop element 19 which is structured for limiting the maximum downwards vertical displacement of the rear supporting plate 16, and therefore of the upper heating plate 5, with respect to the ceiling 4b of bell-shaped body 4, so as to avoid the complete extraction of tubular rod 17 from bush 18.

In the example shown, stop element 19 consists in a nut or washer 19 which is screwed or keyed on the tubular rod 17, close to the upper end of the latter. The position of nut 19 on tubular rod 17 may be varied by the user so as to regulate the maximum lowering of the upper heating plate 5 inside the bell-shaped body 4.

Moreover, stop element 19 may also consist in a transversal pin fitted onto tubular rod 17, above bush 18 and close to the upper end of rod 17.

Figure 4:
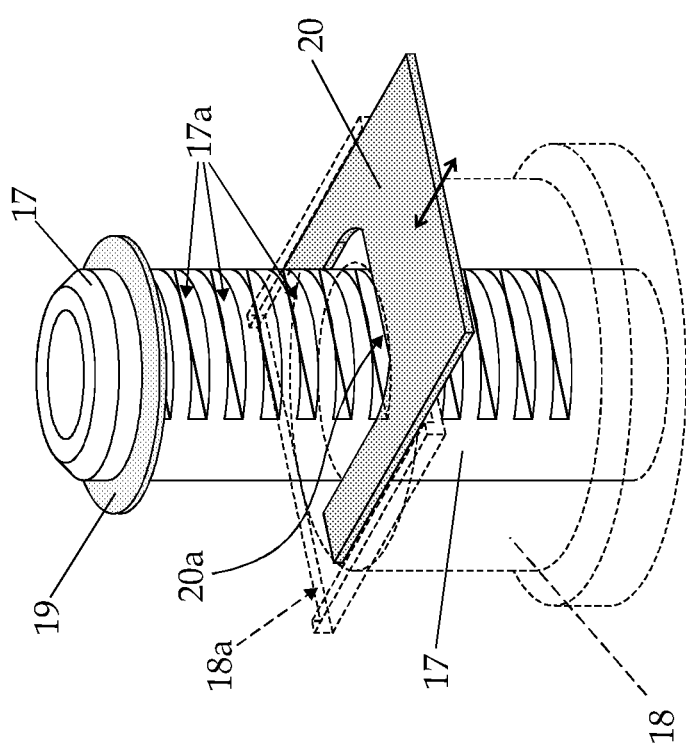
FIG. 4 is an enlarged perspective view, with parts removed for clarity, of the upper portion of the cooking appliance shown in FIG. 3.

With reference to FIGS. 2, 3 and 4, the heating-plate locking device 14 is preferably, thought not necessarily, located on the top of bush 18, and comprises a latch element 20 which is movable with respect to bush 18 to and from a locking position in which latch element 20 cooperates with tubular rod 17 so as to impair any axial displacement of the tubular rod 17 with respect to bush 18; and a moving servomechanism structured for moving, on command, latch element 20 to and from said locking position.

More specifically, latch element 20 is fitted in axially sliding manner onto a supporting socket 18a realized preferably, thought not necessarily, on the top of bush 18, so as to move between a locking position (see FIG. 2) in which the latch element 20 abuts on the tubular rod 17 so as to impair any axial displacement of the tubular rod 17 with respect to bush 18, and an unlocking position (see FIG. 3) in which the latch element 20 is spaced from the tubular rod 17 so as to let the tubular rod 17 move freely inside bush 18; and the moving servomechanism is structured for moving, on command, latch element 20 on the supporting socket 18a between the locking position and the unlocking position.

In particular, with reference to FIGS. 2, 3 and 4, in the example shown the moving servomechanism comprises preferably, though not necessarily, a spring member 21 structured for elastically keeping the latch element 20 in the unlocking position, and an electric linear actuator 22 which, on command, is able to move and keep the latch element 20 in the locking position overcoming the elastic force of spring member 21. Alternatively, the moving servomechanism may consists of only an electric linear actuator which, on command, is able to move and keep the latch element 20 either in the locking position on in the unlocking position.

As regards latch element 20, in the example shown tubular rod 17 is provided with a number of transversal grooves or slots 17a which are conveniently spaced along one side of the upper portion of the tubular rod 17 which projects above bush 18; and latch element 20 consists in a rigid flat plate 20 which extends and is movable on supporting socket 18a on a reference plane substantially perpendicular to the longitudinal axis of tubular rod 17, and is located on the top of bush 18 in a guillotine-like configuration, directly faced to the side of the tubular rod 17 provided with the transversal grooves or slots 17a.

The plate-like latch element 20 is movable on supporting socket 18a between a locking position (see FIG. 2) in which the lateral edge 20a of the plate-like latch element 20 fits into the transversal groove or slot 17a which is locally coplanar to latch element 20, so to impair any further axial movement of tubular rod 17 inside bush 18; and an unlocking position (see FIGS. 3 and 4) in which the lateral edge 20a of the plate-like latch element 20 is spaced from the tubular rod 17 and allows the tubular rod 17 to slide freely inside bush 18.

If there is no transversal groove or slot 17a coplanar to latch element 20, the lateral edge 20a of the plate-like latch element 20 abuts and scrapes against the outer surface of tubular rod 17, until the lowering of the upper heating plate 6 brings a transversal groove or slot 17a coplanar to latch element 20.

The electric linear actuator 22 may be structured for pushing the plate-like latch element 20 against tubular rod 17 so as to slow down the lowering of the upper heating plate 6.

With reference to FIGS. 3 and 4, in the example shown the lateral edge 20a of the plate-like latch element 20 is preferably though not necessarily, provided with a lateral indentation or cove dimensioned for housing the tubular rod 17, and the plate-like latch element 20 is located on the top of bush 18 astride of tubular rod 17, in a guillotine-like configuration.

The electric linear actuator 22, in turn, is fixed on ceiling 4b of bell-shaped body 4, sideways of the top of bush 18, substantially coplanar to latch element 20, and is aligned to the plate-like latch element 20, on the opposite side of tubular rod 17, with its movable shaft 22a faced to the plate-like latch element 20, and the distal end of the movable shaft 22a fixed to the plate-like latch element 20 so as to pull, on command, latch element 20 in the locking position.

Finally, with reference to FIGS. 2 and 3, in the example shown spring member 21 consists in a coil spring 21 having a first end fixed to the distal end of movable shaft 22a, and a second end fixed to the outer casing of the electric linear actuator 22.

General working of electric cooking appliance 1 is clearly inferable from the above description, with no further explanation required. Apart the fact that the upper heating plate 5 immediately rests by gravity on the upper part of the food products f laying on the lower heating plate 3 when the user places the upper bell-shaped body 4 in the closed position.

As regards operation of the heating-plate locking device 14, central control unit 9 firstly switches on the two electric heating devices 7 and 8 and/or the electric microwave generator/s 11 to start the heating up of the food products f resting on lower heating plate 3. After a given lapse of time from the switching on of the heating devices 7 and 8 and/or the microwave generator/s 11, namely 1-30 seconds, central control unit 9 switches on also the heating-plate locking device 14 so as to rigidly connect the upper heating plate 5 to the ceiling 4b of the bell-shaped body 4, and therefore prevent the upper heating plate 5 from pressing any longer the food products f resting on the lower heating plate 3.

In other words, central control unit 9 switches on the heating-plate locking device 14 after a given lapse of time from the start of the cooking cycle, so as to let the upper heating plate 5 press by gravity the food products f to be cooked only at beginning of the cooking cycle, when food products are less soft.

This trick allows optimal and uniform cooking of toast, sandwich and similar food products whilst avoiding excessive crushing of the slices of bread and increasing softness of the food products.

The advantages connected to the presence of the heating-plate locking device 14 are considerable: general appearance and softness of sandwiches and similar food products are no more compromised during cooking cycle.

Clearly, changes may be made to the electric cooking appliance 1 as described herein without, however, departing from the scope of the present invention.

Figure 6:
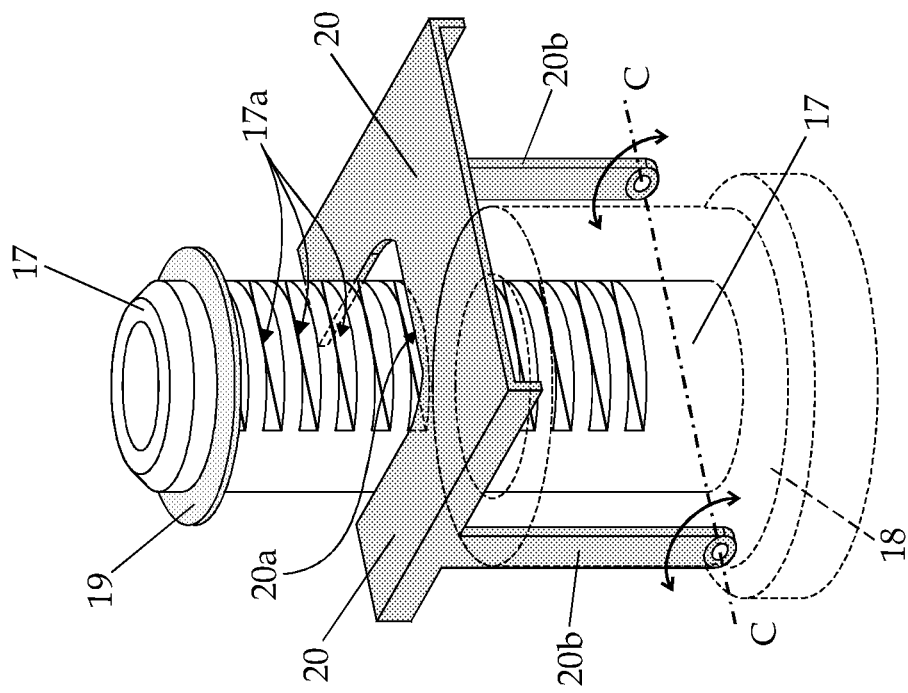
FIG. 6 is a enlarged perspective view, with parts removed for clarity, of the upper portion of the cooking appliance shown in FIG. 5.
Figure 5:
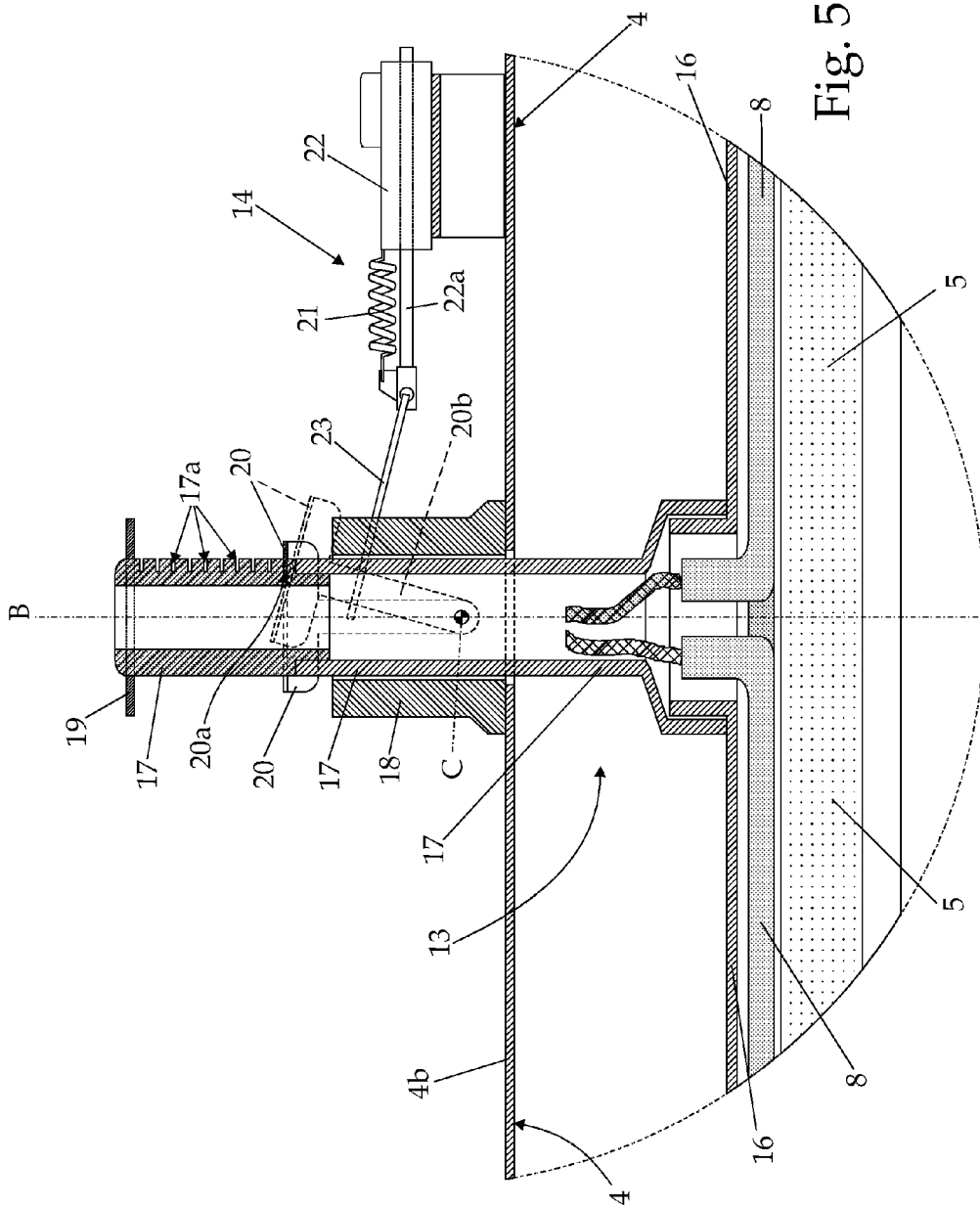
FIG. 5 is a enlarged view, with parts in section and parts removed for clarity, of a different version of the upper portion of the cooking appliance shown in FIG. 3.

For example, with reference to FIGS. 5 and 6, the latch element 20 consists in rigid flat plate 20 which is located on the top of bush 18, and is pivotally jointed to the body of bush 18 so as to rotate about a transversal axis C which is substantially perpendicular to the longitudinal axis B of tubular rod 17, and is parallel to and spaced from the reference laying plane of the flat plate 20. Transversal axis C is preferably though not necessarily, coplanar to the longitudinal axis B of tubular rod 17.

In other words, flat plate 20 is pivotally jointed to the body of bush 18 so as to rotate/rock about axis C remaining locally substantially tangent to a reference cylindrical surface extending coaxial to axis C, and is movable between a locking position (see FIG. 5) in which the lateral edge 20a of the flat plate 20 is located immediately above the top of bush 18 and fits into the transversal groove or slot 17a which is substantially tangent to the top of bush 18, so to impair any axial displacement of tubular rod 17 inside bush 18; and an unlocking position in which the lateral edge 20a of the flat plate is spaced sideways of the tubular rod 17 thus allowing the tubular rod 17 to slide freely inside bush 18.

In the example shown, in particular, transversal axis C is preferably, though not necessarily, located below the top of bush 18, and flat plate 20 is provided with two side arms 20b which project from the two opposite side edges of flat plate 20, and extend towards the base of bush 18 remaining parallel to axis B and perpendicular to the reference laying plane of the flat plate 20. Side arms 20b are therefore parallel and faced to one another, on opposite sides of bush 18, and are pivotally jointed to the body of bush 18, close to the base of bush 18, so as to freely swing about axis C and maintain the flat plate 20 locally substantially tangent to a reference cylindrical surface coaxial to axis C.

In this embodiment, the electric linear actuator 22 is preferably, thought not necessarily, connected to one of the side arms 20b of flat plate 20 via a connecting rod 23 having a first end hinged to the side arm and a second end hinged to the distal end of the movable shaft 22a.

Also in this case, the lateral edge 20a of flat plate 20 is preferably, thought not necessarily, provided with a later indentation or cove dimensioned for housing tubular rod 17, and the flat plate 20 is located on the top of bush 18, astride of tubular rod 17 in a guillotine-like configuration In a further non-shown embodiment, the connecting assembly 13 may also comprise a coil spring or similar elastic member, which is fitted on the tubular rod 17 preferably, though not necessarily, between the ceiling 4b of bell-shaped body 4 and the rear supporting plate 16, so as to partially counterbalance the force of gravity and thus reduce the force pushing the upper heating plate 5 downwards against the food products f resting on the lower heating plate 3.

The invention claimed is:

1. A cooking appliance (1) comprising a lower casing (2) structured for resting on a generic working table, a lower food-contacting heating plate (3) which is positioned on the top (2a) of the lower casing (2) in a substantially horizontal position and is structured for directly supporting the food products (f) to be cooked, and an upper bell-shaped body (4) which is movably mounted on the lower casing (2) so as to be movable to and from a closed position in which the bell-shaped body (4) rests on the top (2a) of the lower casing (2) and defines, together with the lower casing (2), a closed cavity (10) containing the lower heating plate (3); the cooking appliance (1) being also provided with an upper food-contacting heating plate (5)
   which is located inside the bell-shaped body (4) so as to be positioned, when the bell-shaped body (4) is in the closed position, over the lower heating plate (3) substantially parallel to the latter, and
   which is connected to the bell-shaped body (4) via a connecting assembly (13) structured so as to allow the upper heating plate (5) to move freely inside the bell-shaped body (4) in a direction (d0) substantially perpendicular to the reference laying plane of the upper heating plate (5); the cooking appliance (1) also comprising a heating-plate locking device (14) which is able, on command, to selectively impair any movement of the upper heating plate (5) in said moving direction (d0); and a control unit (9) which controls the heating-plate locking device (14) so as to activate said heating-plate locking device (14) for impairing any movement of the upper heating plate (5) in said moving direction (d0), after a given lapse of time from the starting of the cooking cycle, and to let the upper heating plate (5) press by gravity the food products to be cooked only at the beginning of the cooking cycle.

2. Cooking appliance according to claim 1, wherein said heating-plate locking device (14) is able, on command, to rigidly connect the upper heating plate (5) to the bell-shaped body (4) so to impair any movement of the upper heating plate (5) with respect to the bell-shaped body (4); and that the control unit (9) is configured to activate said heating-plate locking device (14) after a given lapse of time from the starting of the cooking cycle.

3. Cooking appliance according to claim 1, wherein the length of said lapse of time is settable by the user, or is automatically determined by the control unit (9) according to the food products (f) to be cooked, or is preset in the control unit (9).

4. Cooking appliance according to claim 1, wherein the connecting assembly (13) comprises a rear supporting plate (16) rigidly connected to the back of the upper heating plate (5), and a rectilinear rod (17) which protrudes from the rear supporting plate (16) along a first axis (B) substantially perpendicular to the reference laying plane of the upper heating plate (5) and which is slidingly coupled with a frame member (4b, 18) of the bell-shaped body (4).

5. Cooking appliance according to claim 1, wherein the connecting assembly (13) also comprises a stop element (19) which is structured for limiting the maximum downwards displacement of the upper heating plate (5) along said moving direction (d0), inside the bell-shaped body (4).

6. Cooking appliance according to claim 4, wherein the heating-plate locking device (14) comprises a latch element (20) which is movable with respect to the rectilinear rod (17) to and from a locking position in which the latch element (20) cooperates with the rectilinear rod (17) so as to impair any axial displacement of the rectilinear rod (17) with respect to the frame member (4b, 18); and a moving servomechanism (21, 22) structured for moving, on command, the latch element (20) to and from said locking position.

7. Cooking appliance according to claim 6, wherein said rod (17) is provided with a number of transversal grooves or slots (17a) spaced from each other; and that the latch element (20) comprises consists in a rigid plate-like element (20) movable to and from a locking position in which an edge (20a) of said rigid plate-like element (20) fits into one of said transversal grooves or slots (17a), so to impair any axial movement of the rectilinear rod (17).

8. Cooking appliance according to claim 6, wherein the moving servomechanism (21, 22) comprises an electric linear actuator (22) which, on command, is able to move the latch element (20) to and from the locking position and to keep the latch element (20) in said locking position.

9. Cooking appliance according to claim 8, wherein the moving servomechanism (21, 22) also comprises a spring member (21) structured for elastically keeping the latch element (20) far from the locking position, and the electric linear actuator (22) is able to move and keep the latch element (20) in the locking position overcoming the elastic force of the spring member (21).

10. Cooking appliance according to claim 1, further comprising two electric heating devices (7, 8) which are stably located on the back of, respectively, the lower heating plate (3) and the upper heating plate (5), so to heat up, on command, the heating plates (3, 5).

11. Cooking appliance according to claim 10, wherein the control unit (9) is able also to switch on and off said electric heating devices (7, 8) according to the selected cooking cycle.

12. Cooking appliance according to claim 1, wherein the lower casing (2) and the bell-shaped body (4) are structured so as to realize, when the bell-shaped body (4) rests on the top of the lower casing (2) in the closed position, a microwaves-tight closed cavity (10); and in that the cooking appliance (1) is also provided with at least one microwave generator (11) structured for generating, on command, microwaves having predefined frequency and amplitude, and with a microwave wave-guide means (12) structured for channeling the microwaves from the microwave generator (11) to the microwaves-tight closed cavity (10).

13. Cooking appliance according to claim 12, wherein the control unit (9) is able also to switch on and off said at least one microwave generator (11) according to the selected cooking cycle.

14. Cooking appliance according to claim 1, wherein the lower heating plate (3) and the upper heating plate (5) are made of a rigid material which is resistant to high temperatures and is transparent to microwave and/or infrared radiation.

15. Cooking appliance according to claim 1, further comprising elastic means structured for partially counterbalancing the force of gravity and reducing the force pushing the upper heating plate (5) downwards towards the lower heating plate (3).

16. A cooking appliance (1) comprising a lower casing (2) structured for resting on a generic working table, a lower food-contacting heating plate (3) which is positioned on the top (2a) of the lower casing (2) in a substantially horizontal position and is structured for directly supporting the food products (f) to be cooked, and an upper bell-shaped body (4) which is movably mounted on the lower casing (2) so as to be movable to and from a closed position in which the bell-shaped body (4) rests on the top (2a) of the lower casing (2) and defines, together with the lower casing (2), a closed cavity (10) containing the lower heating plate (3); the cooking appliance (1) being also provided with an upper food-contacting heating plate (5)

which is located inside the bell-shaped body (4) so as to be positioned, when the bell-shaped body (4) is in the closed position, over the lower heating plate (3) substantially parallel to the latter, and which is connected to the bell-shaped body (4) via a connecting assembly (13) structured so as to allow the upper heating plate (5) to move freely inside the bell-shaped body (4) in a direction (d0) substantially perpendicular to the reference laying plane of the upper heating plate (5); the cooking appliance (1) also comprises a heating-plate locking device (14) which is able, on command, to selectively impair any movement of the upper heating plate (5) in said moving direction (d0); and a control unit (9) which controls the heating-plate locking device (14) so as to activate said heating-plate locking device (14) for impairing any movement of the upper heating plate (5) in said moving direction (d0), after a given lapse of time from the starting of the cooking cycle, wherein the connecting assembly (13) comprises a rear supporting plate (16) rigidly connected to the back of the upper heating plate (5), and a rectilinear rod (17) which protrudes from the rear supporting plate (16) along a first axis (B) substantially perpendicular to the reference laying plane of the upper heating plate (5) and which is slidingly coupled with a frame member (4b, 18) of the bell-shaped body (4).

17. Cooking appliance according to claim 16, wherein the heating-plate locking device (14) comprises a latch element (20) which is movable with respect to the rectilinear rod (17)

to and from a locking position in which the latch element (20) cooperates with the rectilinear rod (17) so as to impair any axial displacement of the rectilinear rod (17) with respect to the frame member (4*b*, 18); and a moving servomechanism (21, 22) structured for moving, on command, the latch element (20) to and from said locking position.

18. Cooking appliance according to claim 17, wherein said rod (17) is provided with a number of transversal grooves or slots (17*a*) spaced from each other; and that the latch element (20) comprises consists in a rigid plate-like element (20) movable to and from a locking position in which an edge (20*a*) of said rigid plate-like element (20) fits into one of said transversal grooves or slots (17*a*), so to impair any axial movement of the rectilinear rod (17).

19. Cooking appliance according to claim 17, wherein the moving servomechanism (21, 22) comprises an electric linear actuator (22) which, on command, is able to move the latch element (20) to and from the locking position and to keep the latch element (20) in said locking position.

20. Cooking appliance according to claim 19, wherein the moving servomechanism (21, 22) also comprises a spring member (21) structured for elastically keeping the latch element (20) far from the locking position, and the electric linear actuator (22) is able to move and keep the latch element (20) in the locking position overcoming the elastic force of the spring member (21).

* * * * *